3,248,583
MAGNETIC COUPLING
Donald J. Kullmann, Milwaukee, Wis., assignor to Badger Meter Manufacturing Company, Milwaukee, Wis., a corporation of Wisconsin
Filed Dec. 7, 1962, Ser. No. 243,095
4 Claims. (Cl. 310—104)

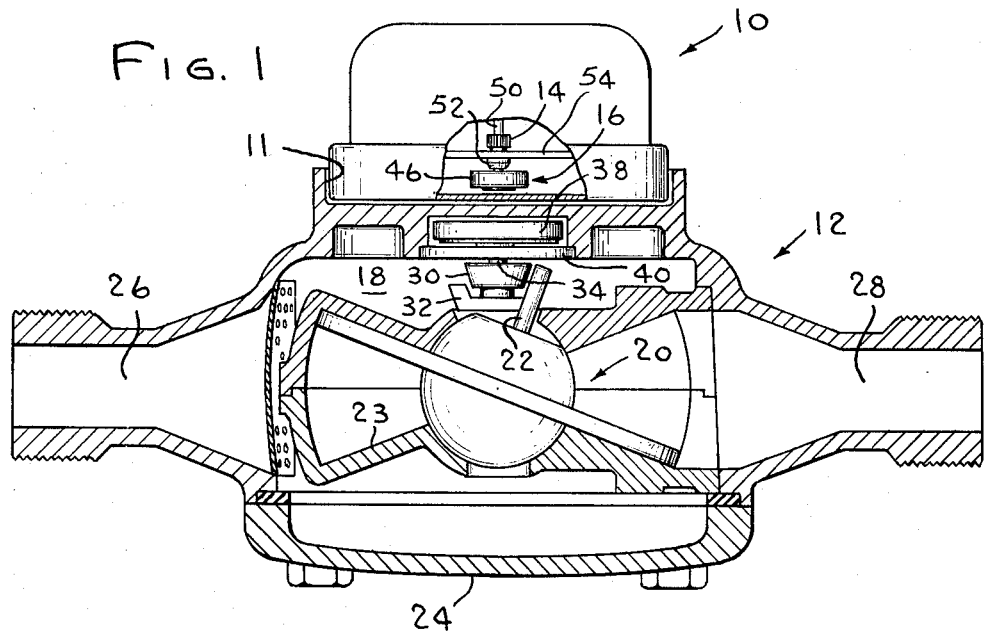
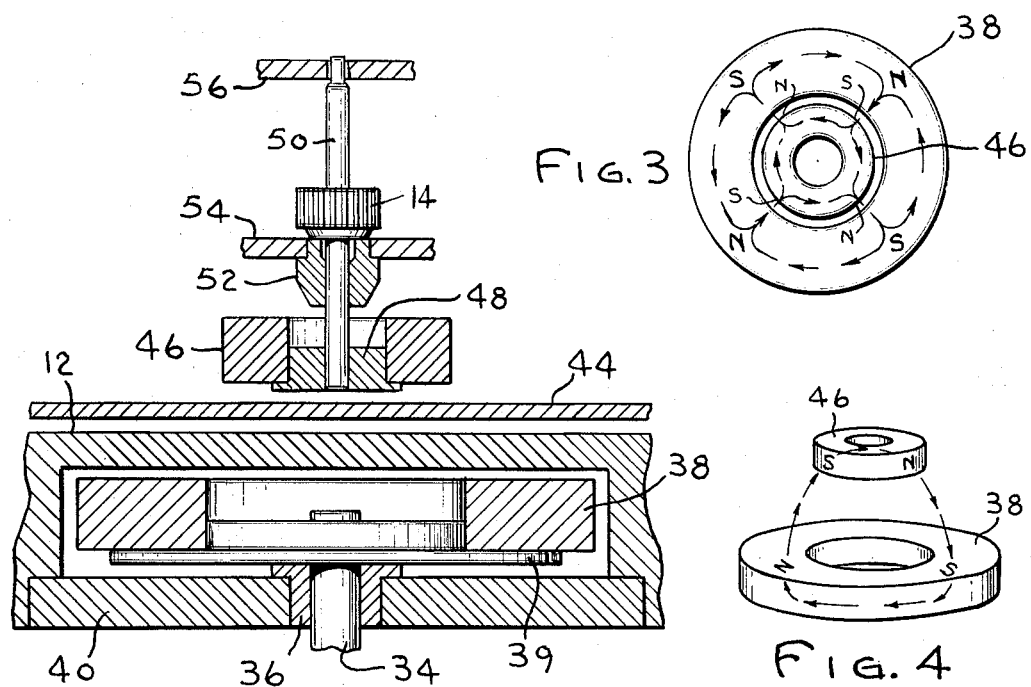
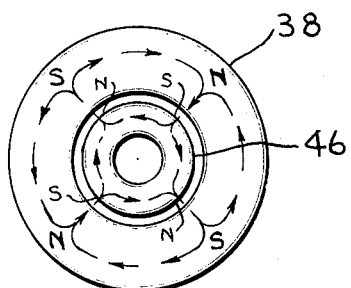
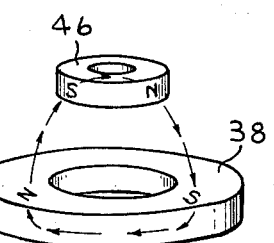
April 26, 1966     D. J. KULLMANN     3,248,583
MAGNETIC COUPLING
Filed Dec. 7, 1962
INVENTOR.
DONALD J. KULLMANN
BY John W. Michael
ATTORNEY ns patent office
3,248,583
Patented Apr. 26, 1966

This invention relates to low torque magnetic couplings for instruments where transmission of rotary motion through a separating member, or wall, is required.

For purposes of illustration, the coupling is shown as it would be incorporated in a fluid meter of the type having the measuring mechanism and the registering mechanism housed in independent sealed compartments separated by one or more imperforate walls. In devices of this type, magnetic couplings have been used to transfer the motion of the measuring element to the registering mechanism. These couplings fall into two general types, axial and radial. The axial type normally consists of two similar permanent magnets, each having poles located on one face, and mounted concentrically with the magnetized faces opposing each other on opposite sides of a separating wall. This type has inherently high thrust loads and requires relatively precise bearings to maintain concentricity and gap tolerances within close limits to avoid excessive losses in efficiency. An advantage of this type of coupling is that the separating wall can be of a simple flat shape. The radial type of coupling, normally consists of two permanent magnetic elements, one, a large toroid having magnetic poles on its inner diameter, and the other, much smaller with a like number of poles on its outer radial surface, located in a concentric co-planer relationship. The separating wall must be of a closed end cylindrical shape to enclose the smaller magnetic element and fit within the inside diameter of the larger element with sufficient clearances to allow free rotative motion. This type requires no thrust bearings, but does require precise radial bearings to maintain the concentricities of the three coplanar parts.

The primary object of this invention is to provide an improved magnetic coupling which: has high torque and low thrust ratios; eliminates the necessity of the thin tube or well normally needed to separate the magnets in a radial coupling; and does not need precise thrust bearings to carry the high thrust load normally found in axial couplings.

A further object of this invention is to provide an improved magnetic coupling that is simple in construction, easily applied to various drive devices, and low in cost.

Still another object of this invention is to provide a magnetic coupling which has a low driven mass that avoids slippage under high acceleration conditions.

These objects are accomplished by using a driving magnet mounted in radial bearings for rotation about an axis and having an even number of magnetic poles on its upper face arranged equidistant from the axis of rotation and equally angularly spaced and a driven magnet also mounted in radial bearings for rotation about an axis and having the same number of magnetic poles on its outer peripheral face arranged equidistant from the axis of rotation and equally angularly spaced. The radius of the periphery of the driven magnet is slightly smaller than the radial distance of the poles on the upper face of the driving magnet from its axis of rotation of the drive magnet. The driven magnet can be mounted in non-critical radial bearings due to its low mass and the elimination of radial clearance limitations. The magnets are positioned on opposite sides of a common non-magnetic flat wall in a substantially parallel and axial relationship. The combination of small radial and large axial poles deflects the magnetic field between the magnets so that axial thrust is reduced to the extent that thrust bearings are not critical.

It is readily apparent to those experienced in the art that the proportional relationship of torque capacity to axial thrust can be varied to meet specific applications by changing the radius of peripheral wall of the driven magnet relative to the radial distance of the poles on the drive magnet from its axis of rotation and vice versa. Another big advantage which is not readily apparent is the ability of this coupling design to remain synchronous under extreme conditions of angular or axial misalignment. Experimental couplings having a driven magnet outside diameter equal to 98% of the drive magnet inside diameter have remained synchronous at speeds up to 1800 r.p.m. at angular misalignment of 45°. This allows for substantial reductions in precision and cost of the entire device to which this coupling is applied.

Other objects and advantages will be pointed out in, or be apparent from, the specification and claims, as will obvious modifications of the single embodiment shown in the drawings, in which:

FIG. 1 is a section view in side elevation showing the position of the magnetic coupling in a water meter;

FIG. 2 is an enlarged view of the magnetic coupling;

FIG. 3 is a top view of the magnets showing a schematic arrangement of the flux paths; and FIG. 4 is a side view of the magnets with a single loop of the flux paths shown.

Referring to the drawings, the fluid meter depicted herein is of the sealed water meter type having an upper hermetically sealed housing 10 mounted with a recess 11 in a lower housing 12. A registering mechanism (not shown) is located within the upper housing and is driven off of a pinion gear 14 on driven magnetic assembly 16.

A water flow measuring mechanism of well known design is positioned within chamber 18 in the lower housing and includes a ball type nutating disc 20 and drive spindle 22 mounted within conical walls 23 which are retained in the chamber by closure member 24. The disc nutates within the walls in response to the passage of water from inlet 26 out through outlet 28 causing the spindle to move through a complete circle each time a measured amount of water passes through the housing. The spindle rides on the outer surface of a conical member 30, and drives a cross member 32 on the end of shaft 34. The shaft extends upward through radial bearing 36 in disc 40 and supports drive magnet 38 on a support member 39. Disc 40 is secured to the interior of the housing with the drive magnet positioned adjacent wall 44.

A driven magnet 46 is mounted within the upper housing by means of a support member 48 fixed to the end of a shaft 50. This shaft is journaled in radial bearing 52 carried by a plate 54 and in a loose fit bearing in a plate 56 of the registering mechanism. The pinion gear 14 mounted on shaft 50 has a reduced diameter hub resting on the end of the bearing 52 to provide a simple bearing to carry the axial weight and the negligible axial force from the magnetic coupling force. The driven magnet due to its small mass is mounted in non-critical large tolerance radial bearings.

Referring to FIGS. 3 and 4, the drive and driven magnets are shown in a substantially axially aligned relation and parallel to each other. The diameter of the outside cylindrical surface or peripheral face of the driven toroid magnet is slightly smaller than the diameter of the inside cylindrical surface of the drive toroid magnet so that the magnetic flux forces extending radially from the outside cylindrical surface of the driven magnet and axially of the top side of the drive magnet are deflected to a substantially angular relationship relative to the plane of the two magnets. Four poles are shown in the drawing, two north and two south, but the magnets can be made with any number of poles so long as an equal number is provided on each magnet. As shown in FIGS. 3 and 4, the poles in the driven magnet are placed in its outer circumferential surface and the lines of magnetic force extend generally radially of the axis of rotation. In contrast the poles in the driving magnet are in its upper face and are arranged radially equidistant from the axis of rotation at a radial distance greater than radial distance of the poles of the driven magnet from its axis of rotation so that the lines of magnetic force extend from this face in parallel relation to the axis of rotation. Thus the axial force between the two magnets is substantially reduced because of the angular relation of the magnetic fields between the magnets to a point where no special thrust bearings are necessary. Any simple plane bearing to carry the axial weight is all that is required. The location of the driven magnet in close proximity to the magnetic field of the drive magnet provides an extremely strong coupling between the magnets.

This arrangement of the drive and driven magnets has eliminated the necessity of having concentric and precise bearing structures to achieve reliability and long life. The bearings for this structure do not have to be co-axial or concentric to obtain long life and reliability. The reduced mass and radial pole configuration of the driven magnet has reduced loading between the magnets to the point where the efficiency of the coupling is extremely high.

Although only one embodiment of the present invention has been illustrated and described, it will be apparent to those skilled in the art that various changes and modifications may be made therein without departing from the spirit of the invention or from the scope of the appended claims.

I claim:
1. A magnetic coupling adapted to transmit rotary motion through a flat wall of non-magnetic material, comprising,
   a flat wall of non-magnetic material,
   a first magnetic member rotatively mounted on one side of said flat wall with its axis of rotation substantially perpendicular to said wall, said first member having poles in the face thereof adjacent and parallel to said one side, said poles being arranged radially equidistant from its axis of rotation, and
   a second magnetic member rotatively mounted on the other side of said flat wall in substantially co-axial relation with said first member, said second magnetic member having a circumferential outer surface at a radial distance from its axis of rotation less than the radial distance of the poles of said first member from its axis of rotation, and poles in said circumferential surface, whereby said magnets are magnetically coupled with a high torque low thrust ratio.
2. A coupling acocrding to claim 1 wherein each of said magnetic members has an even number of equally angularly spaced permanently magnetized poles of alternately opposite polarity.
3. A magnetic coupling comprising,
   a first magnetic member having an axis of rotation and a pluarlity of poles the faces of which are substantially parallel to, and equally spaced from, said axis, and
   a second magnetic member having an axis of rotation substantially axially aligned with the axis of rotation of said first magnetic member and having a flat face spaced axially from said first magnetic member and substantially perpendicular to its axis of rotation, a plurality of poles having pole face in said flat face, said pole faces of said second member being spaced radially outward of the pole faces of said first member, whereby the magnetic field between said members is deflected so that axial thrust therebetween is reduced to a negligible amount.
4. A magnetic coupling according to claim 3 in which, said first member has a relatively small mass, and said second member has a relatively large mass.

References Cited by the Examiner
UNITED STATES PATENTS

| | | | |
|---|---|---|---|
| 280,322 | 6/1883 | Nash | 310—103 X |
| 1,024,741 | 4/1912 | Nash | 310—103 X |
| 1,724,873 | 8/1929 | Ford | 73—253 |
| 2,722,617 | 11/1955 | Cluwen et al. | 310—103 |
| 2,745,027 | 5/1956 | Williford | 310—103 |
| 2,783,401 | 2/1957 | Foster et al. | 310—104 |
| 3,035,442 | 5/1962 | Dunn | 73—258 |

ORIS L. RADER, *Primary Examiner.*

DAVID SCHONBERG, *Examiner.*